United States Patent [19]

Jones

[11] 4,334,776
[45] Jun. 15, 1982

[54] HOLOGRAPHIC PLATE EXPOSURE METER

[75] Inventor: Robert W. Jones, Huntsville, Ala.

[73] Assignee: The United States of America as represented by the Secretary of the Army, Washington, D.C.

[21] Appl. No.: 109,379

[22] Filed: Jan. 3, 1980

[51] Int. Cl.³ .............................................. G01J 1/42
[52] U.S. Cl. .................................................. 356/218
[58] Field of Search ............... 356/215, 218, 227, 221; 250/273, 274; 350/320; 307/290, 311

[56] References Cited

U.S. PATENT DOCUMENTS

| | | | |
|---|---|---|---|
| 2,386,320 | 10/1945 | Kott | 356/215 X |
| 2,521,890 | 9/1950 | Alexander | 356/215 |
| 3,664,740 | 5/1972 | Rich | 356/215 X |

OTHER PUBLICATIONS

Tektronix Oscilloscope Reference Information, Tektronix Products Catalogue 1974, pp. 11 and 15.
Wimberly et al., "Chemical Laser Flow Simulation and Mixing Studies Using Holographic Flow Visualization Techniques," U.S. Army Missile Command publication Technical Report RK-73-14, Aug. 28, 1973.

Primary Examiner—John K. Corbin
Assistant Examiner—Bruce Y. Arnold
Attorney, Agent, or Firm—Nathan Edelberg; Robert P. Gibson; Freddie M. Bush

[57] ABSTRACT

A photographic exposure meter in visualization equipment for detecting the presence or absence of a pulse of laser light on a target. Light from a laser pulse which forms a hologram, is scattered when it impinges on the target plate and detected by a photodetector, the resultant pulse signal being integrated and amplified. The output pulse, proportional to the hologram exposure, is fed to a storage oscilloscope for convenient display.

1 Claim, 3 Drawing Figures

HOLOGRAPHIC PLATE EXPOSURE METER

DEDICATORY CLAUSE

The invention described herein may be manufactured, used, and licensed by or for the Government for governmental purposes without the payment to me of any royalties thereon.

BACKGROUND OF THE INVENTION

In developing a hologram of laser pulses of light, the photographic plate used for holographic flow visualization is developed to provide the hologram. However, misalignment of the laser used to provide the laser pulse can result in no pulse being received on the photographic plate. The plate is subsequently developed to determine whether or not a pulse was received as well as to obtain the hologram. The exposure meter allows detection of these light pulses, and eliminates unnecessary development of the plate.

SUMMARY OF THE INVENTION

A holographic plate exposure meter is used in conjunction with an oscilloscope to detect and show the presence or absence of laser light in holographic flow visualization equipment. In the meter a photodetector detects laser light scattering from the photographic plate of the visualizaton equipment, amplifies it, and couples the signal to the oscilloscope.

DESCRIPTION OF THE PREFERRED EMBODIMENT

Figure 1:
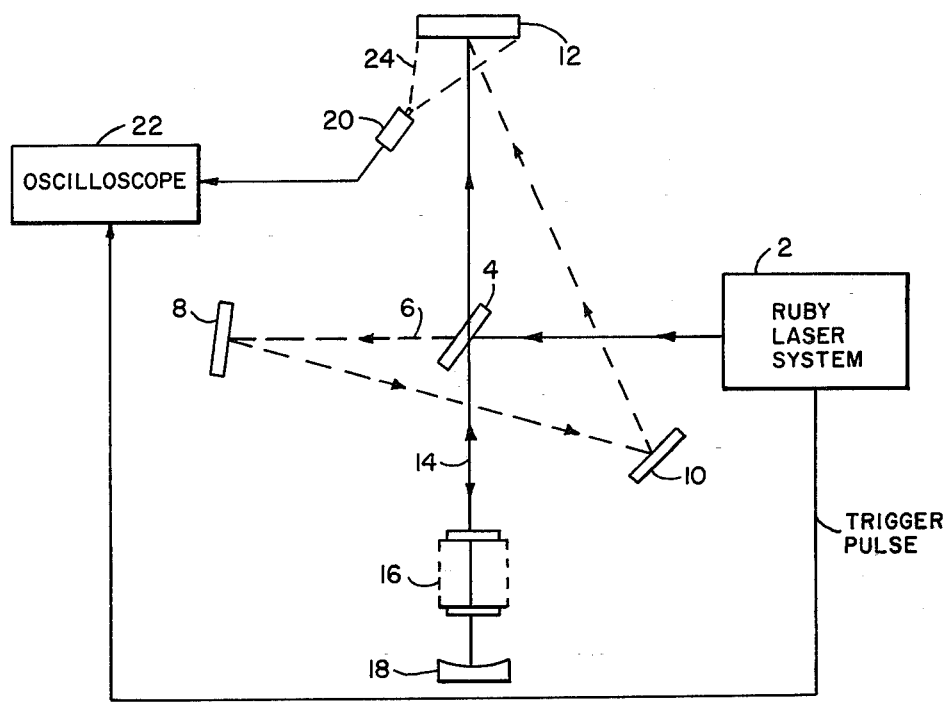
FIG. 1 is a diagram, partially block and partially schematic, of a hologram forming optical system utilizing the exposure meter.

Referring now to the drawings wherein like numbers represent like parts, FIG. 1 discloses a diagrammatic view of typical flow visualization equipment with which the exposure meter or detector may be used. In the hologram forming optical system of FIG. 1, a coherent, pulsed ruby laser 2 provides a Q-switched output light pulse to beam splitter 4. The beam is separated by beam splitter 4 into two paths. Along a first path a reference beam 6 is reflected from a primary mirror 8 and a secondary mirror 10 to a photographic plate 12. Along a second path an object beam 14 makes a double pass through a flow cavity 16, being reflected from spherical mirror 18 back through cavity 16 to pass through beam splitter 4 and impinge on plate 12, where it is recombined with the reference beam. The recorded data on plate 12 provides a hologram, containing information about the flow structure in the cavity 16. Subsequently, this information can be reconstructed using routine hologram methods.

Cavity 16 in this example is the reaction chamber of a chemical laser device wherein flowing gases are mixed. However, this technique is valid for other systems which use holography as a diagnostic procedure. Holographic optics are used to visualize and study the mixing of gases which might be combined in a chemical laser. Studies of these gases using holographic optics is disclosed in a U.S. Army Missile Command publication, Technical Report RK-73-14, entitled "Chemical Laser Flow Simulation and Mixing Studies Using Holographic Flow Visualization Techniques", by Wemberly, Thorne, and Butler, 28 Aug. 1973.

Since the interference of the two beams is recorded by exposure of photographic plate 12, a hologram is produced which can be used to reconstruct the gas flow of interest in the cavity 16. However, any slight misalignment of the ruby laser optics during a test or series of tests results in the laser not firing. This results in zero signal being coupled to the photographic plate, which is only discovered by developing the photographic plate and discovering that no hologram was exposed. Additionally, the exposure of the hologram is proportionally determined by the flux (joules/$cm^2$) on the photographic plate, which can be varied over a large range. Whether or not the appropriate or desirable laser pulse energy (joules) was obtained is also determined through after the fact development of the photographic plate.

To alleviate these difficulties and prevent unnecessary waste of photographic plates and lost time a holographic plate exposure meter 20 (FIG. 1) is provided to monitor the exposure of plate 12. An oscilloscope 22 is coupled to the meter for displaying the detected signal. Obviously, other means of display or recognition of the appropriate signal than an oscilloscope may be employed such as an oscillograph or threshold signal level detector.

Figure 2:
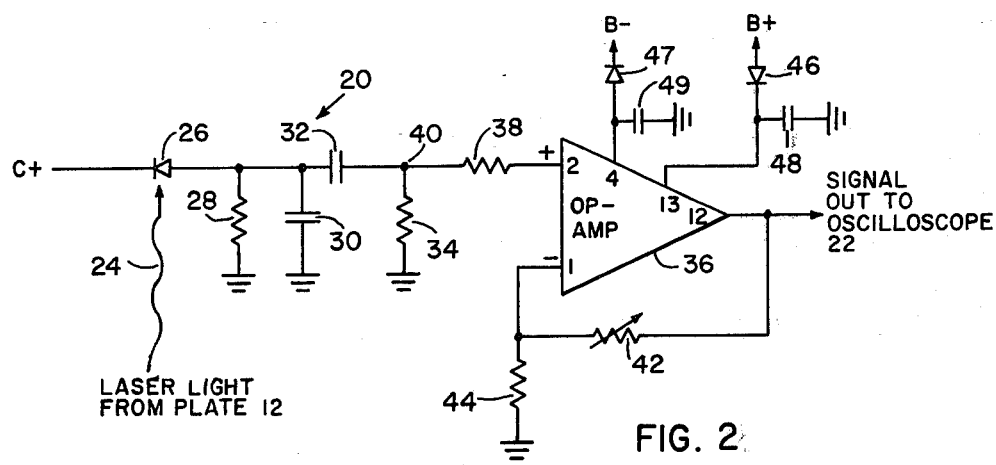
FIG. 2 is the electrical schematic of the exposure meter or detector of FIG. 1.

FIG. 2 is a schematic of the exposure meter 20 which detects scattered laser light 24 from the photographic plate 12. The laser light is sensed by photodiode 26. Diode 26 has a high direct current voltage C+ (typically 90 volts) coupled to the cathode to provide a reverse bias. The anode of diode 26 is coupled through a resistor 28 and capacitor 30 to ground, and through a series connected capacitor 32 and resistor 34 to ground. An operational amplifier 36 has a positive input coupled through a resistor 38 to a junction 40 between capacitor 32 and resistor 34. An output signal is coupled from amplifier 36 to storage oscilloscope 22 by way of a 75 ohm coaxial cable. The output is also fed back to a negative input of the amplifier by way of a potentiometer 42. The negative input is also coupled through a resistor 44 to ground. The operational amplifier is supplied with appropriate driving voltages B+ and B− by way of respective diodes 46 and 47, with respective capacitors 48 and 49 being coupled to diodes 46 and 47 to reduce any radio frequency pick-up.

In operation, a light pulse 24 scattered from the holographic plate falls on the silicon diffused, PIN, photodiode 26, which is reverse biased by C+. The light pulse is converted to a voltage pulse and transferred to resistors 28 and 34 and capacitor 30, which are of sufficient time constant to essentially integrate the pulse. Any direct current component from the photodiode caused from stray light is isolated from the amplifying circuit by capacitor 32. The desirable signal then passes through to operational amplifier 36, having input impedance 38.

The gain of amplifier 36 may be varied with potentiometer 42, which is typically preset for a nominal 3 volt signal output of 75 ohms impedance, when the correct photographic plate exposure has been previously ascertained.

Figure 3:
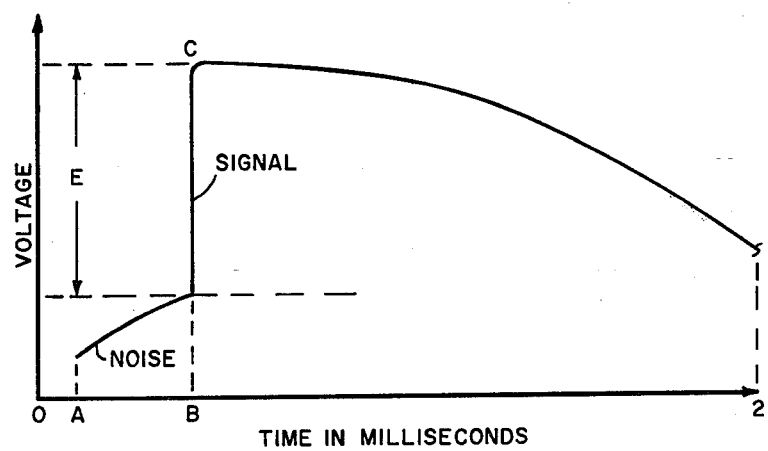
FIG. 3 is a typical exposure meter output as shown on an oscilloscope or other recording device.

A typical output from the holographic plate exposure meter is shown in FIG. 3. The storage oscilloscope 22 is triggered (FIG. 1) at point A by the laser flash lamp pulse. From point A to point B represents the time lapse before the laser is Q-switched. Substantially at point B the output from the laser is impinged on plate 12 and the scattered light pulse signal is detected, integrated, and amplified by meter 20. The distance E between points B and C is directly proportional in voltage to the laser beam exposure of plate 12. The particular output of FIG. 3 represents a noise level from the detector of 10 millivolts and a recorded voltage of 3 volts, which is proportional to an acceptable light energy level impinging on the plate, giving a correct exposure. Had the laser not fired, there would have been no pulse jump from B to C and only the noise would have been present on the oscilloscope. Thus, it is readily apparent from the signal displayed on the oscilloscope whether or not the plate has been exposed. The plate therefore need only be developed when a suitable signal presence is indicated, and then only when an acceptable level is obtained if desired.

The exposure meter can be constructed from off the shelf items and typically may be comprised of the following components:

26—photodiode, EG&G, SGD 100 A
28—15 megohms, ¼ watt
34—1 megohm, ¼ watt
38—900 ohms, ¼ watt
42—100 K ohms, ¼ watt, variable
44—1 K ohm
32—3900 pf, 100 v.
30—0.01 $\mu$f, 100 v.
48,49—30 $\mu$f, 25 v.
46,47—50 v, 0.1 A diodes
36—operational amplifier, Fairchild $\mu$A 747.

Although a particular embodiment and form of this invention has been illustrated, it will be apparent to those skilled in the art that modification may be made without departing from the scope and spirit of the foregoing disclosure. Therefore it should be understood that the invention is limited only by the claims appended hereto.

I claim:

1. A photographic plate exposure meter for detecting the presence or absence of a single pulse of laser energy impinging on a photographic plate comprising: detector means, an integrating circuit, an amplifier, and display means; said detector means being a photodiode for detecting the presence of laser light from a pulse of laser light energy that is reflected or scattered by said plate and providing an electrical output; said display means being an oscilloscope display means; said amplifier being an operational amplifier having an input and an output, said output being coupled to provide an amplified electrical output to said display means, and said integrating circuit being a passive, resistance-capacitance, integrating circuit coupled between said photodiode electrical output and said operational amplifier input for integrating the single pulse signal coupled therethrough and blocking any direct current interference signal.

* * * * *